(12) United States Patent
Faith et al.

(10) Patent No.: US 8,260,269 B2
(45) Date of Patent: Sep. 4, 2012

(54) INPUT DEVICE WITH AN ACCELEROMETER

(75) Inventors: Patrick Faith, Pleasanton, CA (US); Mark Carlson, Half Moon Bay, CA (US); Ayman Hammad, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 65 days.

(21) Appl. No.: 12/954,111

(22) Filed: Nov. 24, 2010

(65) Prior Publication Data

US 2011/0159857 A1 Jun. 30, 2011

Related U.S. Application Data

(60) Provisional application No. 61/264,983, filed on Nov. 30, 2009, provisional application No. 61/264,543, filed on Nov. 25, 2009.

(51) Int. Cl.
*H04M 3/42* (2006.01)
(52) U.S. Cl. .................. 455/414.1; 455/41.1; 455/41.2; 455/41.3; 455/73; 455/556.1; 455/556.2; 455/557; 705/14.17; 705/14.38; 705/14.4; 705/14.49; 705/14.5; 705/14.64; 705/14.65; 705/14.66; 705/14.67; 705/26.1; 705/35; 340/10.1; 340/12.51; 340/12.53; 340/12.54; 340/12.55

(58) Field of Classification Search .................. 455/41.1, 455/41.2, 41.3, 73, 414.1, 556.1, 556.2, 557, 455/558, 562.1; 705/14.37, 14.38, 14.4, 705/14.49, 14.5, 14.64, 14.65, 14.66, 14.67, 705/26.1, 35; 340/10.1, 12.5, 12.51, 12.52, 340/12.53, 12.54, 12.55
See application file for complete search history.

(56) References Cited

U.S. PATENT DOCUMENTS

| | | | |
|---|---|---|---|
| 2009/0061884 A1* | 3/2009 | Rajan et al. | 455/445 |
| 2010/0010964 A1* | 1/2010 | Skowronek et al. | 707/3 |
| 2010/0070378 A1* | 3/2010 | Trotman et al. | 705/26 |
| 2010/0075666 A1* | 3/2010 | Garner | 455/426.1 |
| 2010/0125492 A1* | 5/2010 | Lin et al. | 705/14.5 |
| 2011/0070828 A1* | 3/2011 | Griffin et al. | 455/41.1 |
| 2011/0070837 A1* | 3/2011 | Griffin et al. | 455/41.3 |
| 2011/0126009 A1* | 5/2011 | Camp et al. | 713/168 |

* cited by examiner

*Primary Examiner* — Olumide T Ajibade Akonai
(74) *Attorney, Agent, or Firm* — Kilpatrick Townsend & Stockton LLP

(57) ABSTRACT

Methods, devices, and systems are described for bumping a mobile device, such as a smart phone, against a fixed poster board display at a store to initiate a download of coupons, advertisements, or other benefits to the mobile device. Products can be rated by a user's up/down bump or other bump patterns. Using accelerometer-based inertial measurements, multiple users can control multiple mouse cursors on a large display with their mobile devices in order to select information to be downloaded to their mobile devices.

16 Claims, 12 Drawing Sheets

INPUT DEVICE WITH AN ACCELEROMETER

CROSS-REFERENCES TO RELATED APPLICATIONS

This application claims the benefit of U.S. Provisional Application No. 61/264,543, filed Nov. 25, 2009, and U.S. Provisional Application No. 61/264,983, filed Nov. 30, 2009. The applications above are hereby incorporated by reference in their entireties for all purposes.

BACKGROUND

1. Field of the Art

Generally, systems and methods are disclosed for physically bumping a mobile device against another device to transfer information. More specifically, methods and systems are disclosed for bumping a mobile device against a store's electronic poster board or map in order to download a coupon or other benefit.

2. Discussion of the Related Art

Users have become more dependent on their cellular phones, portable music players, handheld global positioning system (GPS) devices, personal digital assistants, and other mobile devices. Manufacturers have combined functions of once-distinct electronic devices into some mobile devices. Many mobile devices can map where a user is currently located and offer directions to where he or she wishes to go, connect the user to the Internet, and/or store calendar reminders and shopping lists. Entertainment, such as songs, videos, and video games, are playable on some mobile devices so that a user does not get bored while waiting for others. The various features of mobile devices have found their way into both business and personal consumer devices.

Along with users' increased dependencies on mobile devices comes increased expectations of how and where they can be used. Retail stores and service centers have recognized that displaying their locations prominently on Internet-available electronic maps to which users have access on their mobile devices can help increase traffic to their stores. Once a customer is at a store, however, there is little, if any, interaction between the customer and the store through the user's mobile device. Instead, store displays among its aisles and cash registers take up the user's view. There are only so many locations to promote the store's wares without saturating the view.

The inventors of the present application recognize a need in the art for further interaction with users on their mobile devices as the users approach a store or are browsing inside a store.

BRIEF SUMMARY

The present disclosure generally relates to methods, devices, and systems for users to "bump" their mobile phone against an advertisement for an item on an active electronic poster board display at a store and receive a coupon or other benefit on the phone for the item. The poster board can be divided into several squares, each having its own advertisement and corresponding bump sensor.

After a bump, a coupon can be sent via a text message to the phone, for example. The coupon can appear on the phone via a short message service (SMS) text message in the form of a coupon code or a multimedia messaging service (MMS) message in the form of a bar code, the bar code being scannable from the mobile device's screen into a common cash register/terminal scanner.

The present disclosure also relates to methods, devices, and systems for users to bump their mobile phones against an interactive advertisement to rate a product or offer feedback on their like or dislike of the product or service. For example, a store display can ask users to bump the store display with their cell phones if they like or dislike the product. Bumping upward can indicate a thumbs up; bumping downward can indicate a thumbs down. Multiple bumps can indicate the intensity of the like or dislike of the product.

The present disclosure also relates to methods, devices, and systems for users to bump their mobile phones against an interactive map of the store such that the locations of items on a shopping list on their mobile phones are displayed on the map. An optimal route to pick up the items may be displayed as well. The map with displayed locations of items can be downloaded to the mobile phone.

The present disclosure also relates to methods, devices, and systems for users to use their own mobile devices as pointers on a large, shared screen. For example, multiple users can vote via their own 'mouse' pointer on the screen, controlled by their cell phone, for certain products. Users can also indicate, using their 'mouse' pointer on the large screen shared by others, that they wish to download or upload information.

An embodiment in accordance with the present disclosure relates to a method of bumping a mobile device to obtain a benefit, the method including receiving a first message from a mobile device, the first message indicating a bump sensed by an accelerometer coupled to the mobile device, receiving a second message from a second device, the second message indicating a bump sensed by the second device, temporally correlating the messages from the mobile and second devices as an event, determining a benefit associated with the second device, and sending the benefit to the mobile device based on the event.

An embodiment in accordance with the present disclosure relates to a method of recording the bumping of a mobile device, the method including receiving a first message from a mobile device, the first message indicating a bump sensed by an accelerometer coupled to the mobile device, receiving a second message from a second device displaying a benefit, the second message indicating a bump sensed by the second device, temporally correlating the messages from the mobile and second devices as an event, and recording the event. The method can allow for future analysis of a consumer's acknowledgement of the benefit, such as an advertisement, or a vote up or down associated with a displayed advertisement.

The method can further include receiving a user's list of products, such as a shopping list, from the mobile device based on the event, looking up information (such as the location in a store) about each product in the list of products, and sending the information about each product.

An embodiment in accordance with the present disclosure relates to a method of sharing a display to receive a benefit. The method includes receiving a first pointer location on a fixed display from a first mobile device, receiving a second pointer location on the fixed display from a second mobile device, displaying simultaneously a first cursor at the first pointer location and a second cursor at the second pointer location, receiving a selection indicator from the first mobile device, and recording a selection based on the selection indicator and the first pointer location. The method can allow for future analysis of a user's selection on the fixed display.

Other embodiments relate to machine-readable tangible storage media and computer systems which employ or store instructions for the methods described above.

A further understanding of the nature and the advantages of the embodiments disclosed and suggested herein may be realized by reference to the remaining portions of the specification and the attached drawings.

Figure 1:
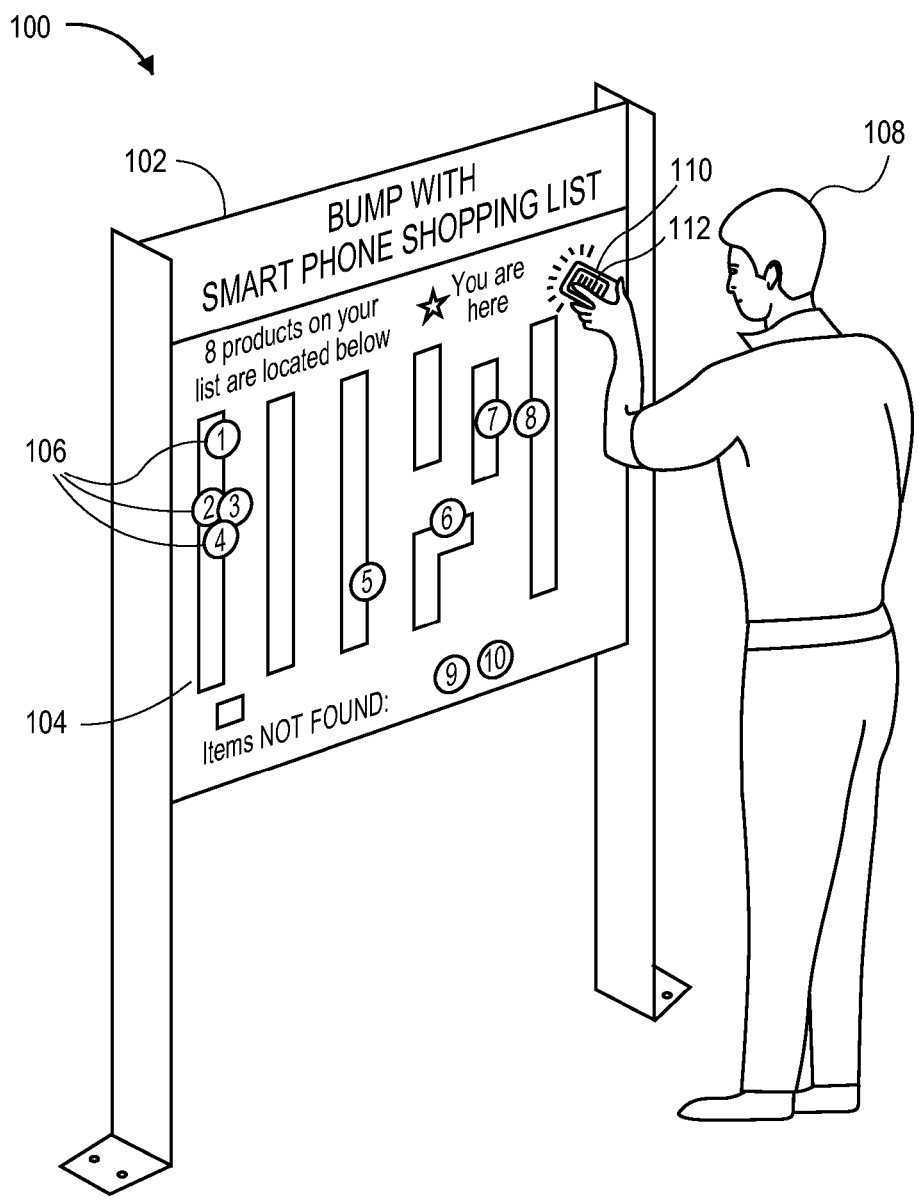
FIG. 1 illustrates a store's map being bumped by a mobile device in accordance with an embodiment.

The figures will now be used to illustrate different embodiments in accordance with the invention. The figures are specific examples of embodiments and should not be interpreted as limiting embodiments, but rather exemplary forms and procedures.

DETAILED DESCRIPTION

Generally, the present disclosure relates to methods and associated software, firmware, and/or hardware for bumping or otherwise physically interacting one's smart phone or other mobile device with a store display in order to download a coupon, advertisement, or other benefit to the mobile device or record the interaction for later analysis or credit. For example, a consumer can walk up to an advertising display at a store and bump his or her cell phone against the display to instantly and automatically download a coupon to the cell phone. The coupon can be sent to the cell phone via an SMS message, so as to give a text/numeric coupon code to read to a cashier at checkout, an MMS message with a bar code coupon that can be scanned at checkout, email, or other means.

A server in a back office of the store or other location can temporally and/or geographically correlate a bump sensed by an accelerometer in the mobile device with one sensed by an accelerometer, pressure transducer, or other sensor on the store display. The server can send a message with a coupon, advertisement, or other benefit to the mobile device while the user continues perusing the store.

An alternate embodiment includes a large display store map upon which a shopper's mobile device, which stores his or her shopping list, is bumped. The map then displays locations of his or her items in the store for the convenience of the shopper. An efficient route to pick up all the items can be displayed. The map can be downloaded onto the mobile device so that the shopper has it with him when walking around the store. Coupons, advertisements, or other benefits can be flashed on the mobile device's screen, urging the user to purchase brand-name products on the list or different, competing products on the list.

Another embodiment includes a product display that encourages a user to bump the product display with her or her mobile device in order to rate the product. The product display includes accelerometers, transducers, or other sensors to sense the bump. The product can be rated by the number of times a user bumps the display with the mobile device, the intensity of the bump, a particular bump pattern, the direction of the bump, or other factors.

Yet another embodiment includes a fixed store display in which two or more users can use their own mobile devices as device pointers to control respective cursors on the display. The cursors can be independently operated by different, unrelated users to rate products, download coupons, display information, or select other options on the display. Screens on the input devices themselves can show the downloaded coupons, product information, etc. The fixed store display can show a static image that does not change when selections are made, or it may change based on users selections.

Technical advantages of the embodiments include novel interaction with a shopper at a store in a format that is intuitive, personal, and original. A store can have only so many advertising displays before its aisles are saturated and the consumer ignores them. In contrast, an advertisement or coupon on the user's personal mobile device can be effective in gaining the user's attention and interest. Furthermore, the advertisement on the mobile device's screen can be animated. The store does not need to have its own large-format, expensive active displays suspended where everyone can see them. The store leverages the processing power, display area, and personal nature of each consumer's mobile device in order to advertise. Furthermore, a consumer might already be accessing his or her mobile device as he or she approaches or enters the store, so further interaction with the mobile device relating to what the consumer is there to purchase may be welcomed by the consumer. An encouragement to physically interact with a display using the phone can be beneficial to the user. It can provide savings in the form of coupons as well as be beneficial to the store to gather information on consumers' product interests. Share displays can lessen the number of displays that a store needs to purchase for interactive advertising. One big display from which many users can download coupons, etc. may be easier to service than many small displays. Suspending the display away up high away from shoppers' hands (e.g., above 8 feet off the floor) while making mouse cursors available to be controlled by user's own cell phones can limit wear and tear, and vandalism, of the displays.

Terms

A "bump" includes a event in which a device is physically contacted against or near another device such that a sensor in at least one of the devices detects that physical movement. A bump of one device against another can include indirect physical contact near the other device such that it can be reasonably inferred that interaction between the two devices was intended. The first device can record first interaction data representative of the movement of the first device towards a second device using an accelerometer or sensor. The second device may record second interaction data representative of movement of the second device towards the first device using a second accelerometer or sensor.

A "poster display" includes a display that is accessible or otherwise viewable to display information, such as advertising, product details, etc. A poster display may be in a large format, such as 2'×3' or 4'×8', medium, such as 8½"×11", small, such as 3"×5" coupon size, or other sizes. The display may be shown at the front of a store, near a product, near a checkout, or otherwise in a location viewable to consumers.

A "multiple bump pattern" includes a pattern of relatively closely-spaced-in-time bumps by one device, such as three bumps in succession, a Morse code pattern, etc. The bumps may be against one object or against different objects. Multiple bumps can be within 1, 2, 5, or more seconds of one another.

A "bump direction" is direction(s) that a mobile device moves during a bump or an orientation(s) that a mobile device is in during the bump. For example, a bump may be left-to-right or right-to-left. As another example, a mobile device can be bumped upside down to indicate a 'thumbs down' for a product, or a mobile device can be bumped right-side up to indicate a 'thumbs up.'

A "selection indicator" includes an indication of a mouse click, an enter key depression, or other indication of a selection.

A "cursor" includes a mouse pointer, text cursor, non-gray focus indicator, or other cursor as is known in the art of computer displays.

A "product indicator" can include a name of a product or service, universal product code (UPC), common or generic name, etc.

"Nearly simultaneously" includes times that are reasonably near in time, such as within 1, 5, 30, 60, or more seconds of each other.

Shopping List Items On Store Map

FIG. 1 illustrates a map being bumped by a mobile device in accordance with an embodiment. Map bump system 100 includes active store display 102 with map 104. Store display 102 has pressure sensors that can detect when an object knocks, rubs, thumps, or otherwise bumps against its surface.

Consumer 108 has his own smart phone 110. Consumer 108 has entered his own shopping list 112 into smart phone 110. A shopping list can be typed, scanned from product bar codes at home, or otherwise entered onto smart phone 110. Smart phone 110 may keep a list of recurring items that the user buys frequently, such as milk or favorite cereals, in the shopping list. In the figure, consumer 108 takes smart phone 110, enables a shopping list 'bump' application on it, and bumps the smart phone against active store display 102. Eight items on shopping list 112 appear as icons 106 in their respective locations on map 104.

Icons 106 can indicate not only where the shopping list items are located, but also if there are any items left in stock on the shelf. For example, a grayed out icon can indicate that the store normally stocks the item but that the store is out of stock of the item. Other indicators, such as colors, blinking or flashing icons, etc. can indicate items that are on sale, are competitor or generically equivalent products, etc. Icons can include trademarks and/or service marks that may be readily associated by shoppers to particular items.

Symbiotic products to those on the shopping list can be displayed on the map. For example, if peanut butter is on the shopping list, then icons for jelly or bread can be shown in their respective locations. Similar logic can be applied for items that a consumer might need based on multiple items on the list. For example, if mosquito repellant, batteries, and trail mix are on the list, it may be determined that the user is going camping. Because the user is going camping, icons pertaining to firewood, extra flashlight bulbs, and s'mores supplies can be displayed on the map.

Items on the shopping list that are not found can be indicated by icons outside of the map or on the margins of the map. A database may store the names of such items for further analysis by the store. If enough people request the same item, then the store may wish to stock the item regularly on its shelves.

Poster Display

Figure 2:
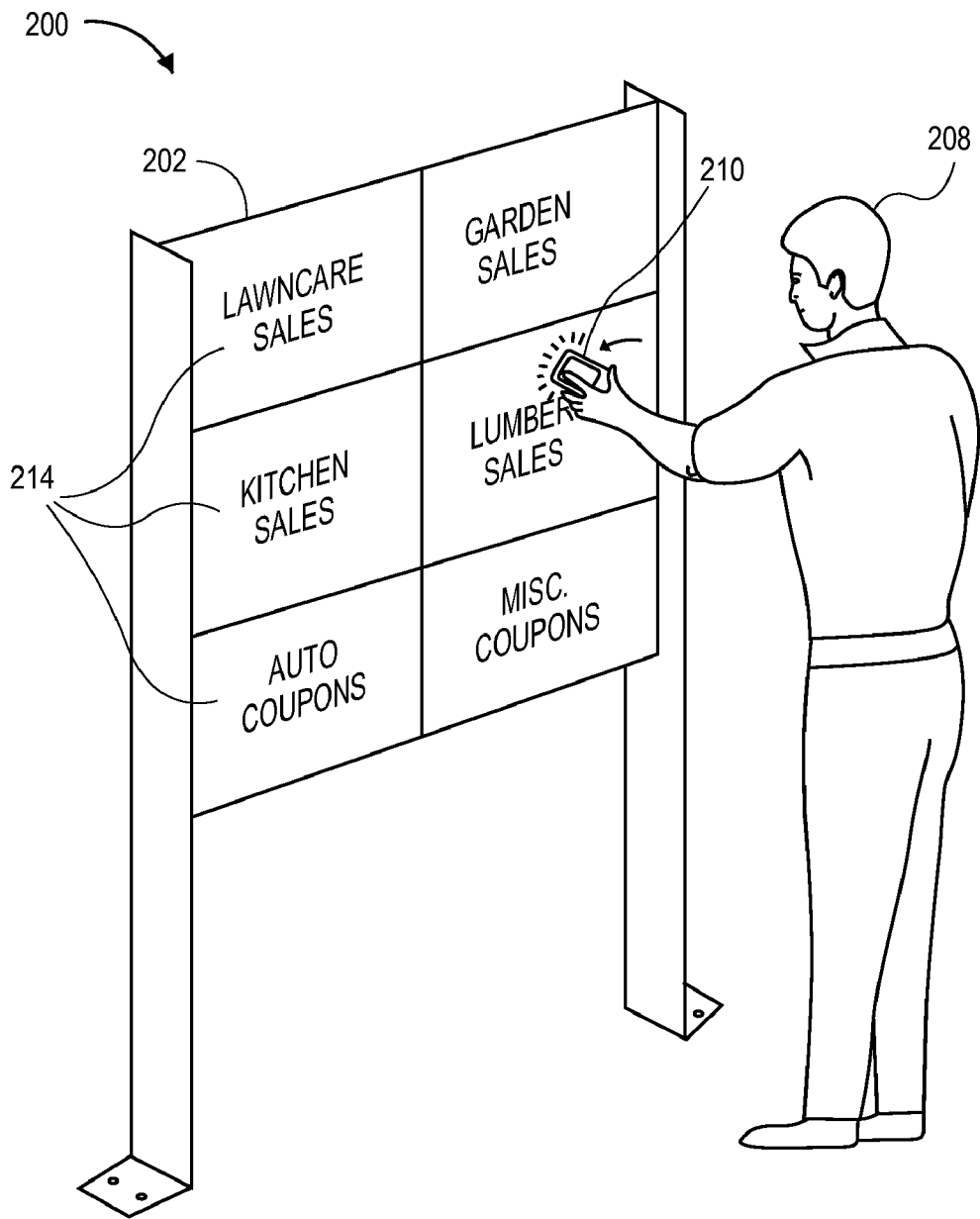
FIG. 2 illustrates a poster board display being bumped by a mobile device in accordance with an embodiment.

FIG. 2 illustrates a poster display being bumped by a mobile device in accordance with an embodiment. Poster board display system 200 includes store display 202 with advertisements 214 listing the departments of a do-it-yourself hardware store. Advertisements 214 each have their own area on the poster board with corresponding pressure switches. In the figure, consumer 208 takes mobile device 210, enables a 'bump' application on mobile device 210, and bumps the mobile device against the desired advertisement in order to download to mobile device 210 information on sales in the selected department. For example, an advertisement downloaded to the phone could include a 'new low price' for redwood fence posts or sheets of mold-resistant drywall.

Exemplary store display 202 includes a simple paper/cardboard stock covering sensors beneath; however, such a display can include an active, touch-sensitive display screen. With a touch sensitive screen, advertisements can be reconfigured without printing onto paper stock and without the labor of tacking up the paper stock to the display and testing.

In some embodiments, a randomly selected advertisement can be sent from an advertisement pool to a mobile device. For example, a first hit of the store display can give the consumer a first coupon on his or her phone, and a second hit can give the consumer a different coupon. Both the first and second coupons are selected from a pool of a dozen or so advertisements, coupons, or other benefits. Coupon pools can be different sizes and actively managed to keeping out coupons that are irrelevant to particular shoppers. For example, if it is known that a shopper does not have small children, then diapers, baby bottles, and other supplies for small children can be excluded from a health accessories pool.

Figure 3:
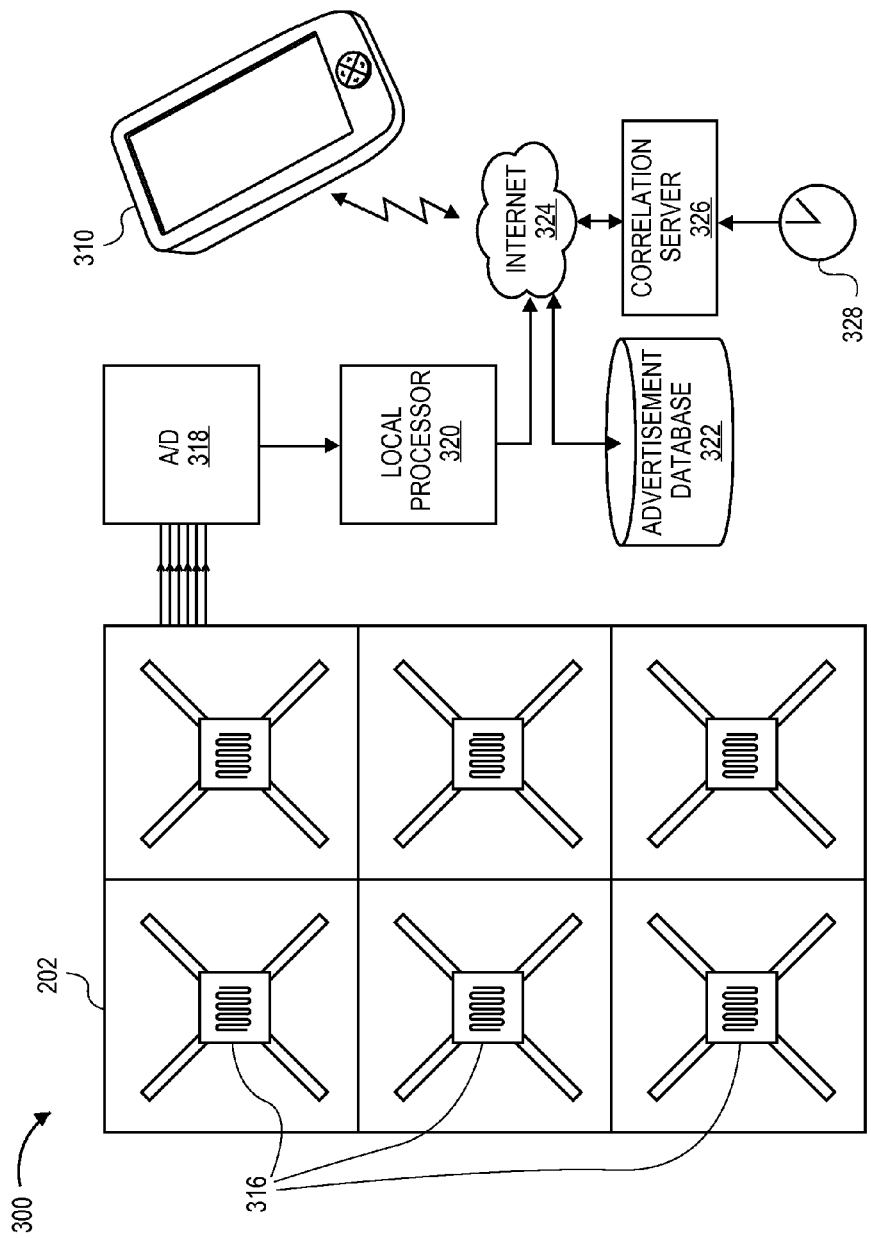
FIG. 3 illustrates active poster board sensors connected with a system in accordance with an embodiment.

FIG. 3 illustrates active poster board sensors connected with a system in accordance with an embodiment. System 300 includes store display 202, shown in the figure without the covering paper stock of advertisements. Store display 202 includes pressure sensors 316. Other sensors can be used, such as but not limited to resistive or capacitive touch screens, accelerometers, infrared transducers, etc. Pressure sensors 316 sense a bump event against their related rectangles on the store display.

Sensors 316 are coupled to analog-to-digital (A/D) converter 318, which takes in analog voltages or currents from the sensors and digitizes them. ND converter 318 is operatively coupled to local processor 320, which in turn is connected to Internet 324. Other networks, such as intranets, virtual private networks (VPNs), etc. can also be used to connect the various devices of the system. Advertisement database 322 is also connected to the Internet and can be accessed by local processor 320. Correlation server 326, also connected through the Internet, is synchronized to absolute time clock 328. Absolute time clock 328 may be an Internet-accessible clock, or it can be accessible directly by local processor 320 and smart phone 310. Smart phone 310 is wirelessly coupled to the other devices through the Internet.

When a user bumps smart phone 310 against store display 202, the respective pressure sensor 316 sends an analog signal to ND converter 318. ND converter 318 converts the analog signal to a digital form, and the digital signal is read by local processor 320 to create a bump event corresponding to a particular advertisement. Local processor 320 sends the bump event to correlation server 326. Meanwhile, smart phone 310, reading its own accelerometers and sensing a bump event, sends a bump event to correlation server 326.

Correlation server 326 matches the bump event from local processor 320 to the bump event from smart phone 310. The match can occur by matching absolute times, geographic position, etc. Once the events are correlated, an applicable advertisement, coupon, or other benefit is selected from advertisement database 322 and sent to smart phone 310. Smart phone 310 can then display the benefit to the user who bumped his or her smart phone against the display.

Figure 4:
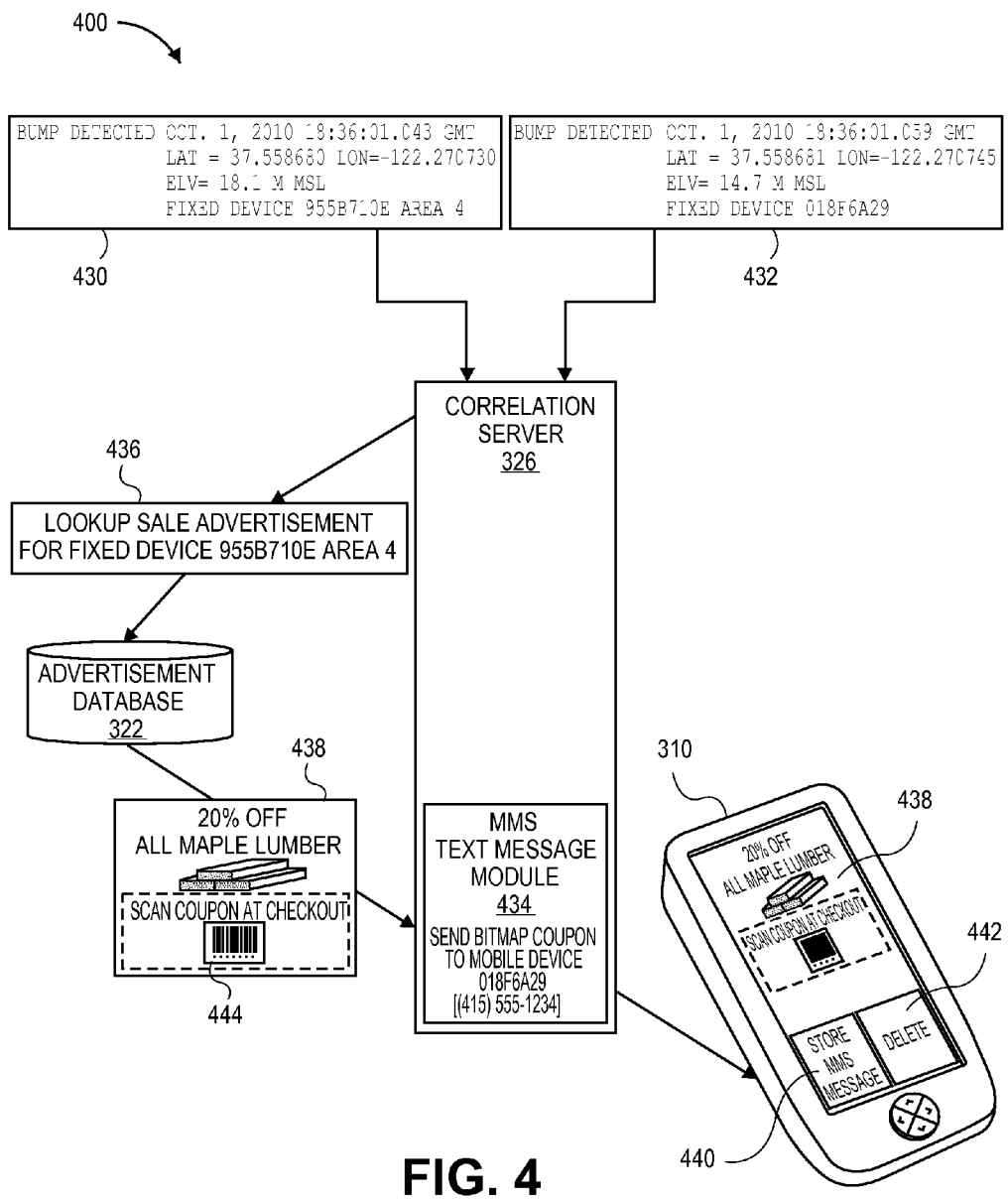
FIG. 4 illustrates correlation server processing in accordance with an embodiment.

FIG. 4 illustrates correlation server processing in accordance with an embodiment. Processing 400 begins in part with a bump detected at a store display. Bump event message 430 from the store display, which includes information on the absolute time, geo-location, identification of the bumped device, and area bumped on the bumped device, is generated by a processor. Meanwhile, bump event message 432 from the mobile device, which includes information on the absolute time, geo-location, and identification of the bumping device, is generated by a processor in the mobile device. Both bump event message 430 from the store display and bump event message 432 from the mobile device are sent to correlation server 326.

Correlation server 326 matches the bump events by temporally matching the absolute times as well as matching the approximate geo-locations. In the exemplary embodiment, the bump events are different in their time stamps by only 0.016 seconds. In some real-world situations, time stamps may be different by much greater time differentials, such as 1, 5, 15, or more seconds due to clock drift, bump measurement eccentricities, and other timing errors. Because the bump events are nearly at the same time as one another and below a threshold, they are temporally correlated.

Correlation server 326 can also match the bump events by matching the geo-location. In the exemplary situation, latitude and longitude differences between the devices are substantial but within tolerances allowed by the correlation server.

After bump events are matched, correlation server 326 sends request 436 to advertisement database 322. Request 436 requests a sale advertisement for the particular portion (i.e., area 4) of the store display that was bumped by the user.

Based on the request, advertisement database 322 returns advertisement-coupon 438 to correlation server 326. Advertisement-coupon 438 includes bar code 444 that can be scanned at checkout. The advertisements and coupons in database 322 can be stored as bitmaps or other pictures, simple text, etc.

MMS text message module 434 of correlation server 326 re-formats and/or packages coupon 438 for sending in a text message. Text message module 434 also looks up the telephone number of the mobile device from the mobile device's device code in message 432. Text message module 434 then sends the re-formatted/packaged coupon to the telephone number.

Smart phone 310, after receiving the text message, displays coupon 438 on its screen as an MMS text message. The message is displayed with 'store' button 440 and 'delete' button 442 so that a user can conveniently store or delete the coupon as he or she desires.

In-Store Survey

Figure 5:
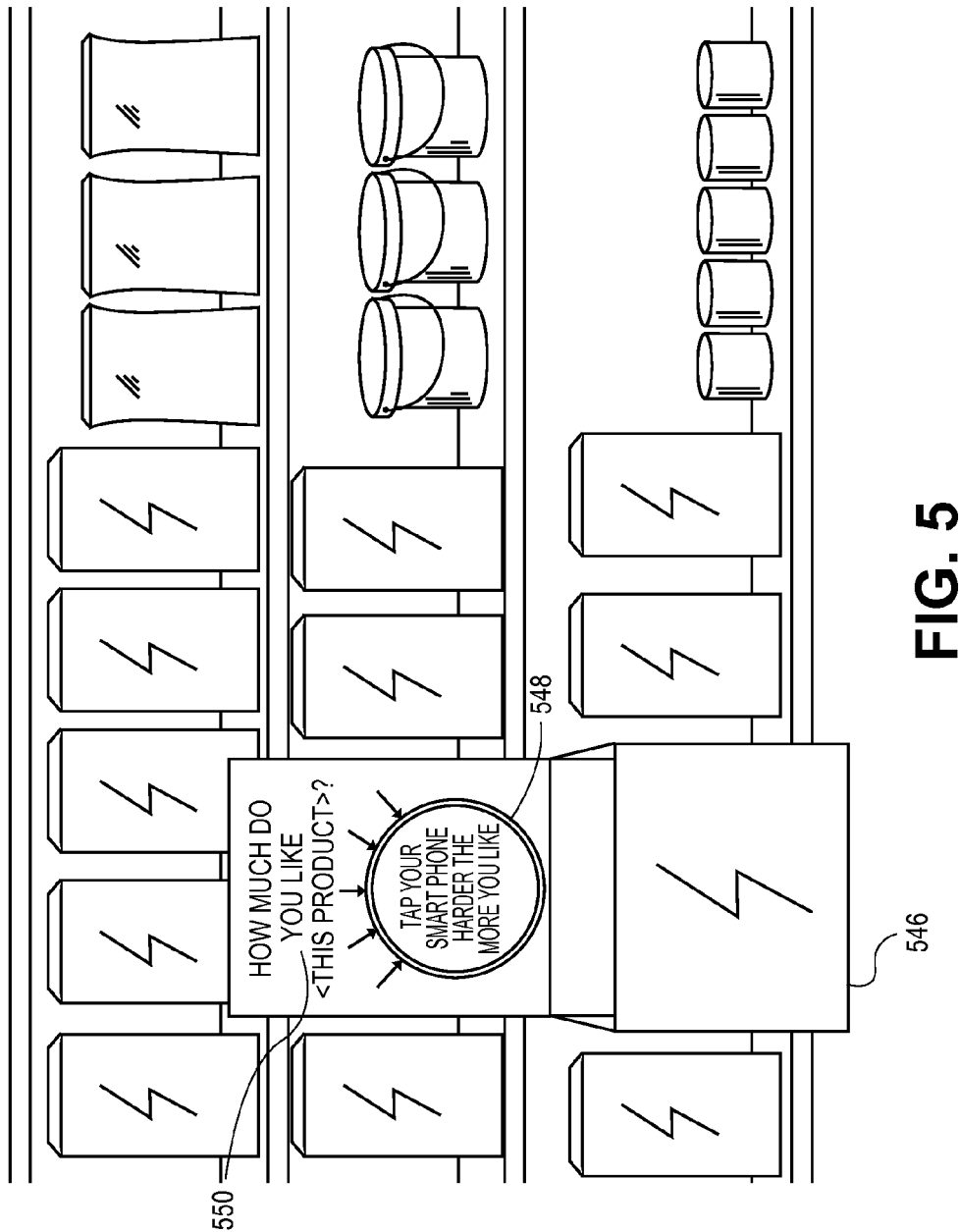
FIG. 5 illustrates a store survey display in accordance with an embodiment.

FIG. 5 illustrates a store survey display in accordance with an embodiment. Store survey display 546 includes advertising prompt 550 for passers by to rate a product. Display 546 includes bump-sensitive area 548.

Bump-sensitive area 548 can sense how hard a user bumps a mobile device against it. The harder the tap, the greater value coupon that can be texted to the phone. For example, a slight tap can give a 50-cent discount, while a harder thump can give a $1.00 discount. Bump-sensitive area 548 can be fitted with foam so as to minimize damage to a user's phone, and the store display, to excessive hits.

A bump-sensitive area can have directional bump sensors so that the store display can determine whether the bump was upward, downward, left-to-right, etc. A sign may indicate that an upward bump by a user's mobile phone votes that the product is well received (thumbs up), and a downward bump votes that the product is poorly received (thumbs down). Alternatively, the mobile device itself can determine the intensity and/or direction of a bump. Multiple bumps up from the same phone can indicate that the users very much likes the product. Bumps in an 'X' pattern can indicate that the user vehemently dislikes the product. Other patterns can be used. For example, musical notes can be displayed, and when the user hits the notes, the product's jingle is played on speakers from the store display.

Figure 6:
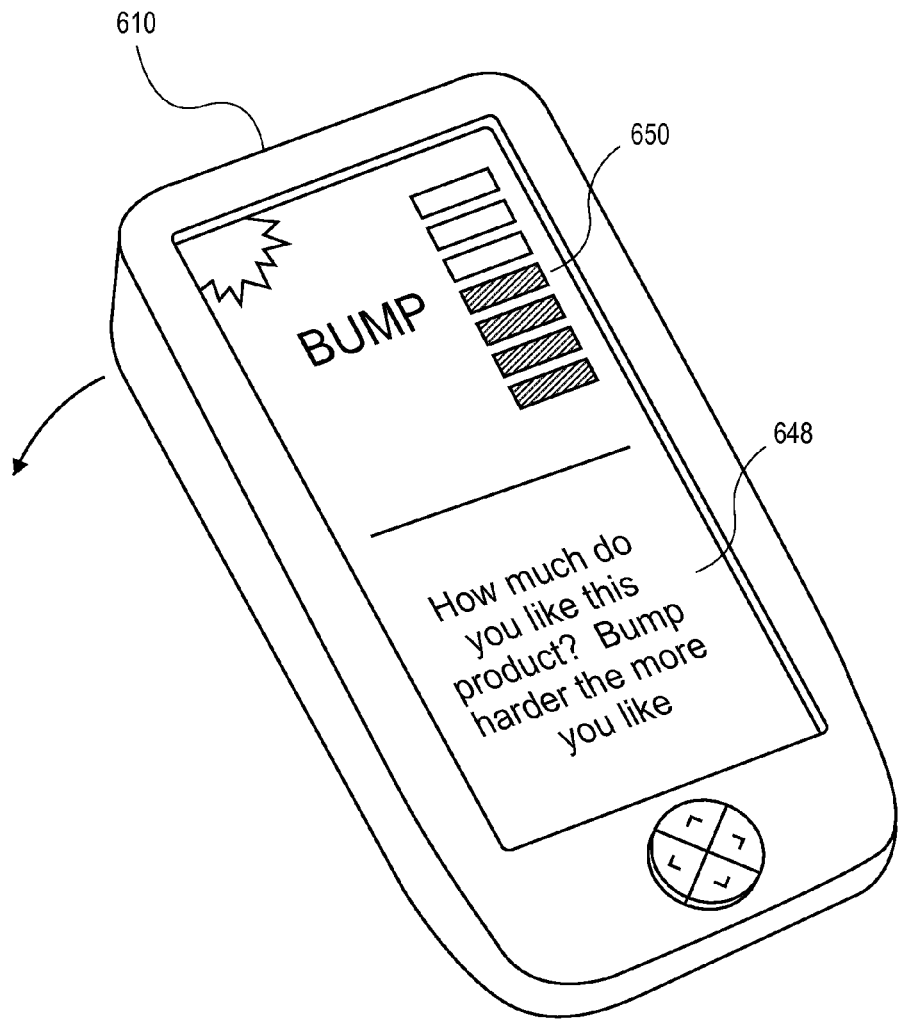
FIG. 6 illustrates a smart phone with a bump intensity application in accordance with an embodiment.

FIG. 6 illustrates a smart phone with a bump intensity application in accordance with an embodiment. Smart phone 610 executes a bump application that displays a prompt 648 asking a user to bump the phone proportionally to how much he or she likes a product. Upon striking the device against a surface, meter 650 displays the intensity of the hit. Other variations of bumping devices can be implemented.

Applications can prompt the user to bump the phone at an exact, target intensity. Bumping too softly or too hard may not be registered as a bump, but a bump at the correct intensity can properly initiate a download of an advertisement or coupon.

Bump directions and bump patterns can be registered by a mobile device in conjunction with certain store displays. Bump directions and patterns can be used to minimize false alarms and unwanted downloading of coupons if, for instance, a store display is accidentally bumped by a user carrying a phone. For example, three taps of the phone against the display in quick succession can indicate one bump event for the purposes of downloading an advertisement, coupon, or other benefit. As another example, a bump up followed by a bump from left-to-right can indicate one bump event.

Secret bump patterns that are known by mavens of a product or other serious users can be utilized for extra points towards coupons, advertising materials, etc. For example, a child can learn from a television advertisement during Saturday morning cartoons that the secret pattern for a particular cereal is up, up, down, right. When shopping with his parents and passing a display in a store, the child can tap the secret pattern with his or her phone on the store display. In response, a special, bonus coupon can be sent to the child's phone. The child can then present the coupon on the phone to his parents in order to convince them to buy the advertised cereal.

Purchase Transaction

After coupons, nutritional information, price information, or other merchant-provided data have been exchanged, a financial transaction may be conducted. In some embodiments, the financial transaction is based on subsequent physical interactions between a consumer's mobile device and a merchant's terminal with an accelerometer (e.g., POS terminal). In other embodiments, no subsequent physical interaction is required to engage in a financial transaction, and the transaction may be conducted based on a prior interaction.

Financial transactions between two devices with accelerometers are described in U.S. application Ser. No. 12/952, 811, titled "Transaction Using a Mobile Device With an Accelerometer," filed on Nov. 23, 2010, and U.S. application Ser. No. 12/953,368, titled "Interaction Terminal," filed on Nov. 23, 2010. These applications are hereby incorporated by reference in their entireties for all purposes.

For example, a customer's mobile device with an accelerometer (or other motion/pressure sensors) may be used to conduct a financial transaction by making physical contact with a merchant's terminal. The customer's mobile device may be a mobile phone or any other mobile device suitable for the customer to carry on his or her person. The merchant's terminal may be a mobile device, such as a mobile phone, personal data assistant (PDA), tablet, handheld device, etc. In other embodiments, the merchant's terminal may be stationary, such as a point of sale (POS) terminal, automated teller machine (ATM), electronic cash register (ECR), kiosk, ticket selling/dispensing terminal, vending machine, magnetic stripe reader device, personal computer, etc.

When the customer's mobile device makes physical contact with a merchant's terminal, interaction data (e.g., accelerometer data, location data, time data) is generated. The interaction data generated by each of the customer's mobile device and merchant's terminal is representative of the physical contact. That is, first interaction data is generated by the mobile device based on the external forces applied to the mobile device. Second interaction data is generated by the merchant terminal based on the external forces applied to the merchant terminal.

A server computer determines, based on the first and second interaction data, that the customer's mobile device and the merchant's terminal made physical contact and interacted. In other embodiments, a processor associated with the merchant's terminal (rather than, or in combination with, the remote server computer) may determine, based on first and second interaction data, that the mobile device and the merchant terminal made physical contact and interacted.

The server or merchant's terminal may determine that the customer's mobile device and the merchant's terminal made physical contact by using a pairing algorithm. The pairing algorithm analyzes and matches interaction data to determine whether two devices physically interacted. The server or merchant's terminal may receive and analyze any combination of accelerometer, location, time, and other data. If the accelerometer, location, and/or time data from the customer's mobile device and the merchant's terminal matches, the pairing algorithm can conclude with sufficient certainty that the devices interacted. If any or all of the accelerometer, location, and time data from the customer's mobile device and the merchant's terminal are sufficiently similar, it can be concluded that the customer's mobile device interacted with the merchant's terminal and that the customer and the merchant intend to conduct a financial transaction. The pairing algorithm can analyze the interaction data in any suitable order. Any combination of interaction data may be analyzed, including time data, location data, or accelerometer data.

After determining that the customer's mobile device and the merchant's terminal made contact, communications that relate to payment processing may be initiated between the devices. The payment processing may include the sending of an authorization request message and authorization response message through a payment processing network. The payment processing network can contain payment authorization, clearing, and settlement services. At the end of the day, a normal clearing and settlement process can be conducted by the payment processing network. A clearing process is a process of exchanging financial details between an acquirer and an issuer to facilitate posting to a consumer's account and reconciliation of the consumer's settlement position. For example, VisaNet™ may be used to process a Visa transaction between the operators of a mobile device and a merchant terminal. The payment processing network may communicate with a plurality of issuer, acquirers, and merchants.

A merchant may have an acquiring bank (i.e., an acquirer), and the merchant's terminal may be in operative communication with the acquirers. A customer may have an issuing bank (i.e., an issuer) that issued a transaction account that can be used for making payments. The transaction account may be linked or otherwise connected to the customer's mobile device and/or a different type of portable consumer device (e.g., a plastic transaction card). Using the payment processing network, a customer and a merchant may conduct a financial transaction. For example, to receive a payment from a customer, the merchant may initiate the sending of an authorization request message by, or through, its acquirer. The acquirer may then forward or send the authorization request message to the issuer associated with the customer's transaction account and linked to a mobile device of the customer. The issuer may approve or not approve of the transaction and respond with an authorization response message. The authorization response message may be sent to the merchant's acquirer and may be forwarded to the merchant. If approved, the transaction is then completed by the merchant and customer.

Shared-Cursor Display

Figure 7:
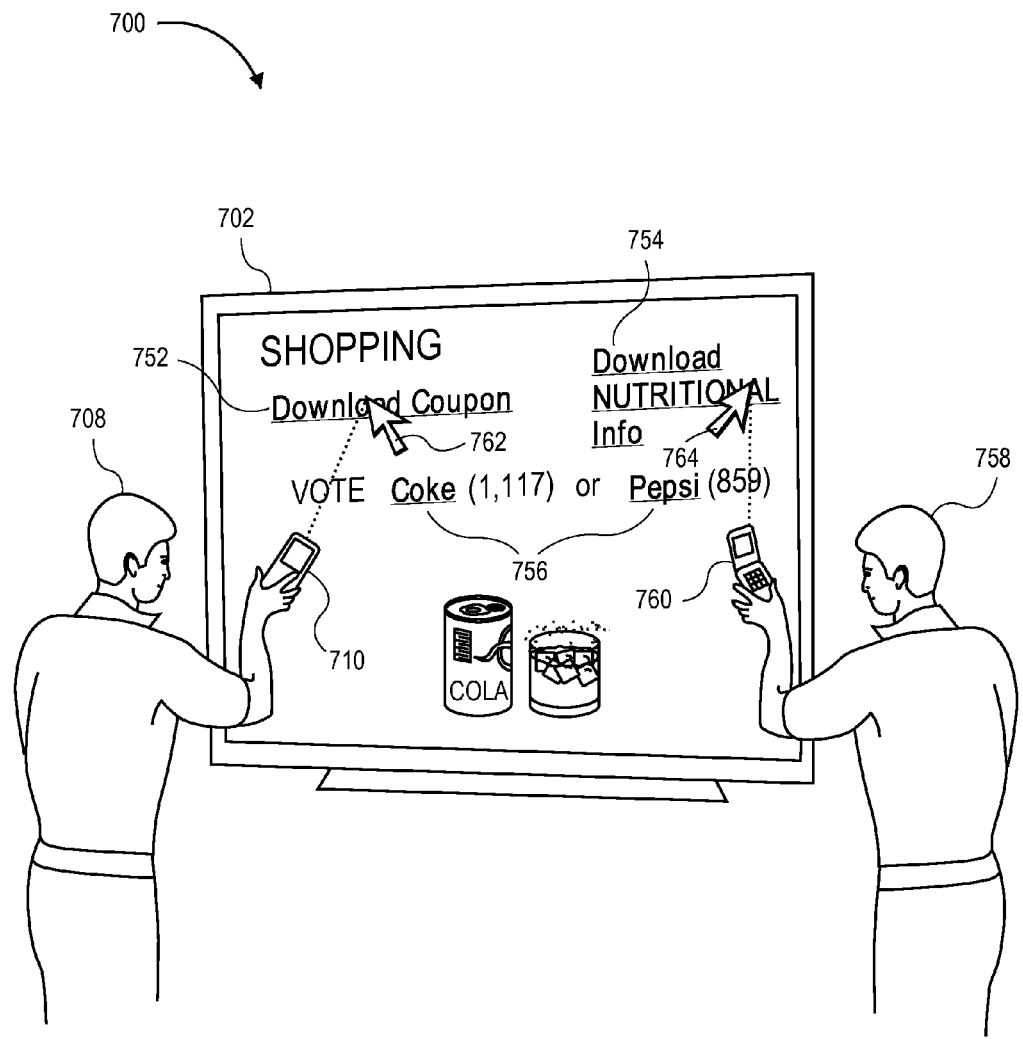
FIG. 7 illustrates pointers on a shared store display in accordance with an embodiment.

FIG. 7 illustrates pointers on a shared store display in accordance with an embodiment. In system 700, fixed store display 702 is available for multiple users to interact with. User 708 uses his smart phone 710 to move mouse cursor 762 on the display. Simultaneously, user 758 uses his cell phone 760 to move mouse cursor 764 on the display.

The location on the screen where the mouse cursors are located correspond to the direction in which each respective mobile device is pointed. This can be determined from accelerometers in each device. The accelerometers can determine the orientation of the device with respect to gravity as well as inertially measure their distance from the display with a virtual inertial measurement unit (IMU) application that uses the accelerometers.

A user can initialize his mobile device against the display by bumping the top of his or her mobile device against the display or a separate calibration area. The direction of the maximum spike in acceleration of the accelerometers (i.e., toward the top of the mobile device), can indicate the direction the pointing direction of the mobile device. As the device is rotated and otherwise reoriented in the user's hands, the accelerometers measure the angular acceleration, velocity, and angle of the mobile device. Additionally, the accelerometers measure linear acceleration, velocity, and position of the mobile device. From the various angular and linear accelerations, an IMU in the mobile device detects its relative position and orientation from when it bumped against the screen.

The fixed store display also calibrates its position with respect to the initial bump. The x, y coordinates on the screen where the fixed store display was initially bumped is saved as an initial condition. Direction and relative position of the mobile device are fed to a central server, and the offset from the initial x, y coordinates on the screen are calculated. A mouse cursor, such as mouse cursor 762, is then displayed on the screen.

The users can slew their respective mouse cursors 762 and 764 over links 752, 754, and 756. Selecting a link can be accomplished by pressing an 'enter' key on a mobile device while its mouse cursor is over a link. By doing so, a user can download a coupon to the respective mobile device (e.g., link 752) or download other information to the mobile device (e.g., link 754).

Selecting one of links 756 can allow a user to vote on his or her product choice. The number of votes can be tallied and shown immediately on display 702. Once a user has voted on his or her favored product, further votes from the same mobile device can be prevented. This is an advantage over voting schemes that merely have a user touch part of the screen to vote because the fact that the user's own mobile device voted is recorded.

Figure 8:
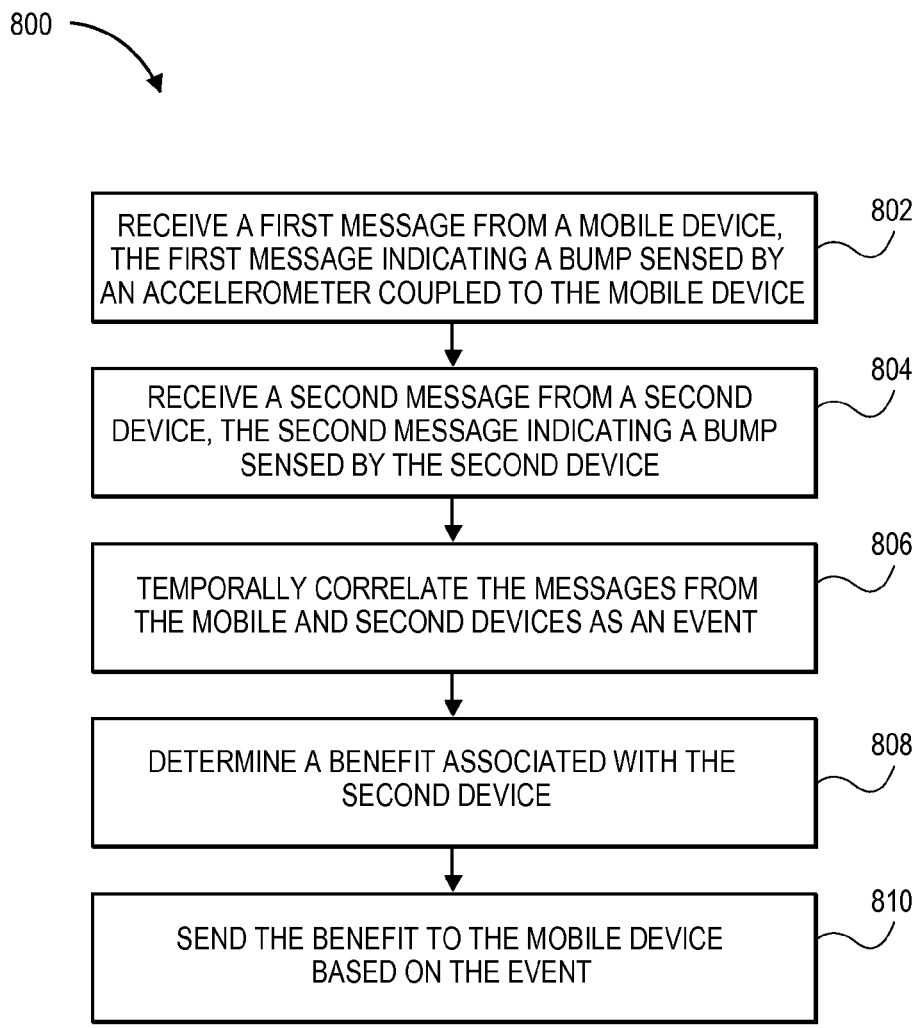
FIG. 8 is a flowchart illustrating a process in accordance with an embodiment.

FIG. 8 is a flowchart illustrating a process in accordance with an embodiment. Operations in the flowchart can be performed by a computer processor or non-computer mechanisms. The process can be coded in software, firmware, or hardware. Process 800 includes operations that are optional. In operation 802, a first message is received from a mobile device, the first message indicating a bump sensed by an accelerometer coupled to the mobile device. In operation 804, a second message is received from a second device, the second message indicating a bump sensed by the second device. In operation 806, the messages from the mobile and second devices are temporally correlated as an event. In operation 808, a benefit, such as an advertisement or coupon, associated with the second device is determined. In operation 810, the benefit is sent to the mobile device based on the event.

Figure 9:
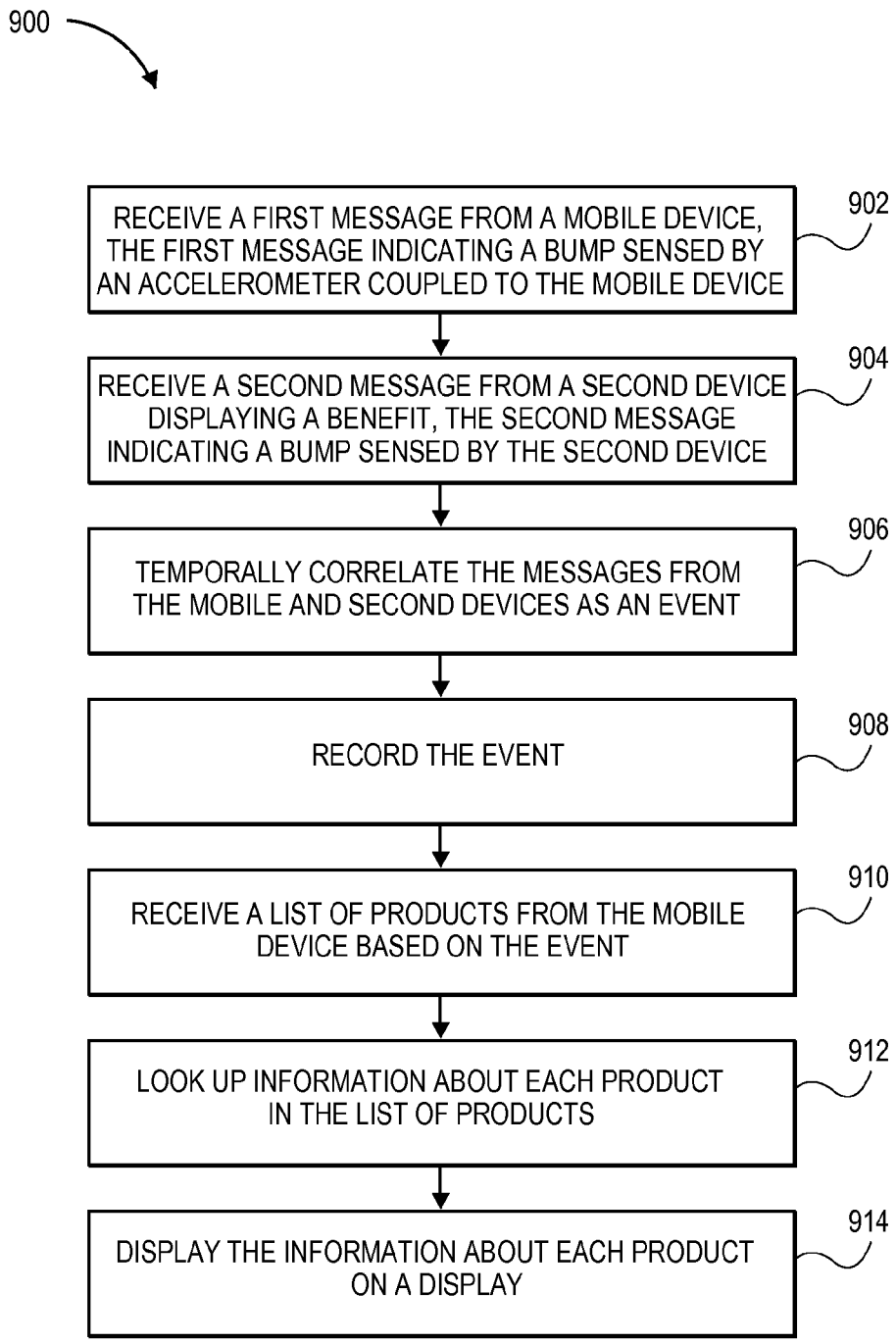
FIG. 9 is a flowchart illustrating a process in accordance with an embodiment.

FIG. 9 is a flowchart illustrating a process in accordance with an embodiment. Process 900 includes operations that are optional. In operation 902, a first message is received from a mobile device, the first message indicating a bump sensed by an accelerometer coupled to the mobile device. In operation 904, a second message is received from a second device displaying a benefit, the second message indicating a bump sensed by the second device. In operation 906, the messages from the mobile and second devices are temporally correlated as an event. In operation 908, the event is recorded. In operation 910, a list of products is received from the mobile device based on the event. In operation 912, information about each product in the list of products is looked up. In operation 914, the information about each product is displayed on a display.

Figure 10:
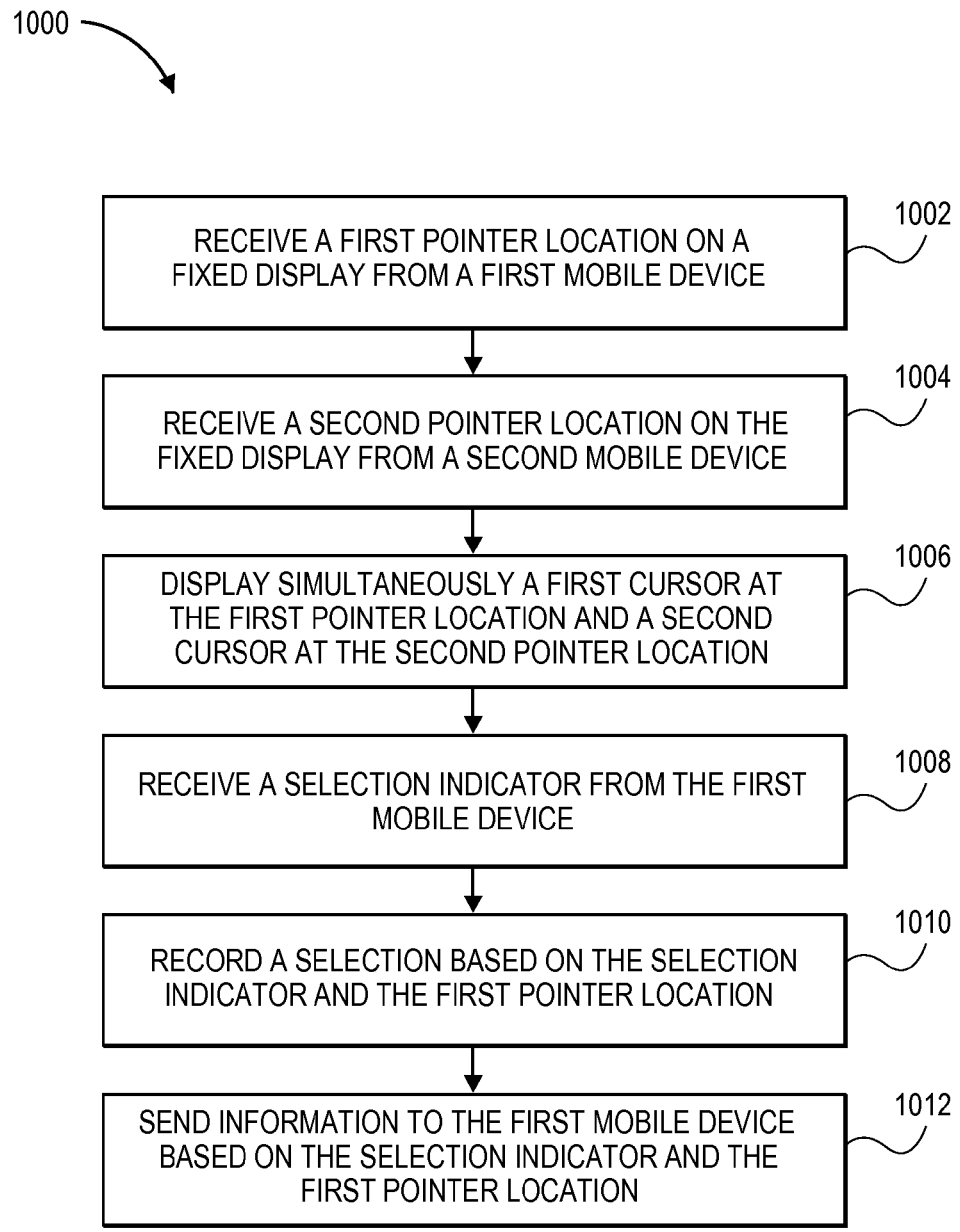
FIG. 10 is a flowchart illustrating a process in accordance with an embodiment.

FIG. 10 is a flowchart illustrating a process in accordance with an embodiment. Process 1000 includes operations that are optional. In operation 1002, a first pointer location on a fixed display is received from a first mobile device. In operation 1004, a second pointer location on the fixed display is received from a second mobile device. In operation 1006, a first cursor at the first pointer location and a second cursor at the second pointer location are displayed simultaneously. In operation 1008, a selection indicator is received from the first mobile device. In operation 1010, a selection based on the selection indicator and the first pointer location is recorded. In operation 1012, information is sent to the first mobile device based on the selection indicator and the first pointer location.

Hardware and Software

Figure 11:
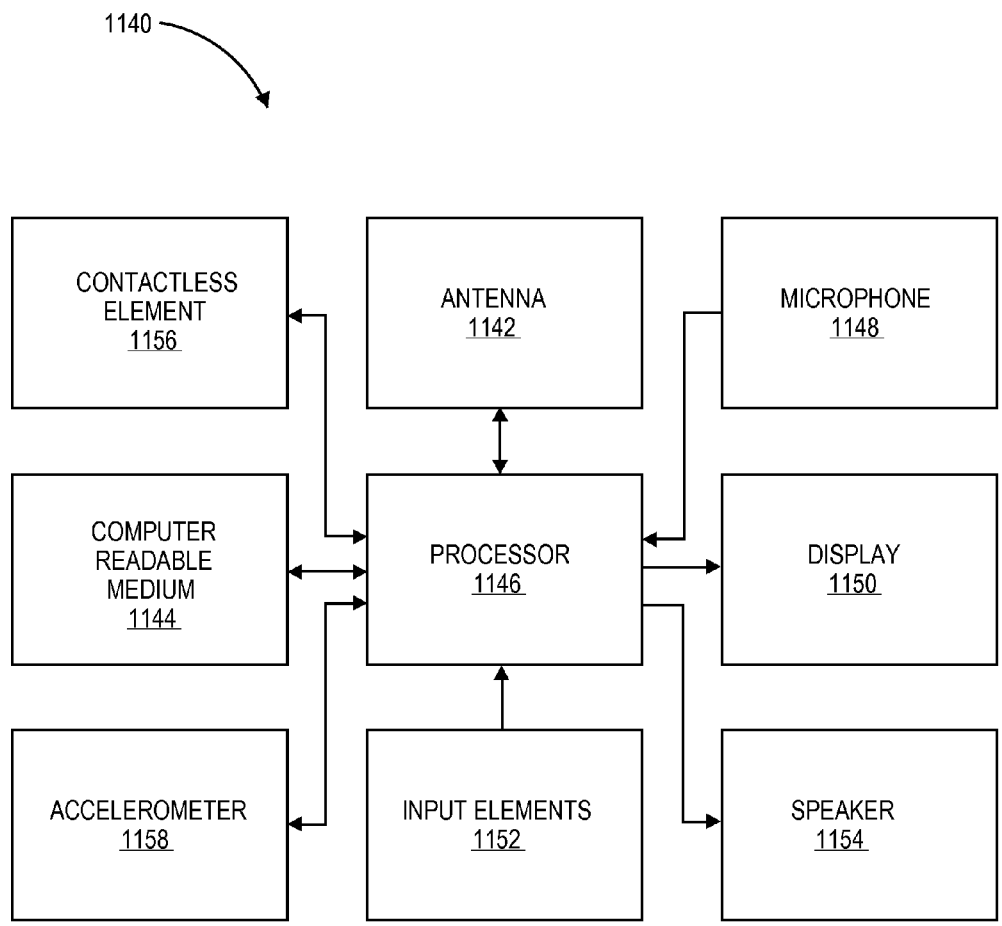
FIG. 11 shows a block diagram of a portable consumer device in accordance with an embodiment.

FIG. 11 shows a block diagram of a portable consumer device or mobile device and subsystems that may be present in computer apparatuses in systems according to embodiments.

An exemplary portable consumer device 1140 in the form of a cell phone may comprise a computer readable medium and a body. The computer readable medium 1144 may be present within the body of the phone, or may be detachable from it. The body may be in the form a plastic substrate, housing, or other structure. The computer readable medium 1144 may be a memory that stores data and may be in any suitable form including a magnetic stripe, a memory chip, encryption algorithms, private or private keys, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc.

Information in the memory may also be in the form of data tracks that are traditionally associated with credit cards. Such tracks include Track 1 and Track 2. Track 1 ("International Air Transport Association") stores more information than Track 2 and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must generally abide by it. It contains the cardholder's account, encrypted PIN, plus other discretionary data.

The portable consumer device 1140 may further include a contactless element 1156, which is typically implemented in the form of a semiconductor chip (or other data storage element) with an associated wireless transfer (e.g., data transmission) element, such as an antenna. Contactless element 1156 is associated with (e.g., embedded within) portable consumer device 1140, and data or control instructions transmitted via a cellular network may be applied to contactless element 1156 by means of a contactless element interface (not shown). The contactless element interface functions to permit the exchange of data and/or control instructions between the mobile device circuitry (and hence the cellular network) and an optional contactless element 1156.

Contactless element 1156 is capable of transferring and receiving data using a near field communications ("NFC") capability (or near field communications medium) typically in accordance with a standardized protocol or data transfer mechanism (e.g., ISO 14443/NFC). Near field communications capability is a short range communications capability, such as RFID, Bluetooth®, infra-red, or other data transfer capability that can be used to exchange data between the portable consumer device 640 and an interrogation device. Thus, the portable consumer device 1140 is capable of communicating and transferring data and/or control instructions via both cellular network and near field communications capability.

The portable consumer device 1140 may also include a processor 1146 (e.g., a microprocessor) for processing the functions of the portable consumer device 1140 and a display 1150 to allow a consumer to see phone numbers and other information and messages. The portable consumer device 1140 may further include input elements 1152 to allow a consumer to input information into the device, a speaker 1154 to allow the consumer to hear voice communication, music, etc., and a microphone 1148 to allow the consumer to transmit her voice through the portable consumer device 1140. The portable consumer device 1140 may also include an antenna 1142 for wireless data transfer (e.g., data transmission).

Portable consumer device 1140 may be used by a buyer to initiate push payments. In some implementations, portable consumer device 1140 can include an interface to allow the buyer to create a payment request message. The portable consumer device 1140 can then send the payment request message to a payment processing network using contactless element 1156 or over a wireless or wired communications channel.

Portable consumer device 1140 can include accelerometer(s) 1158. Multiple accelerometers can be oriented orthogonally or non-orthogonally to each other.

Figure 12:
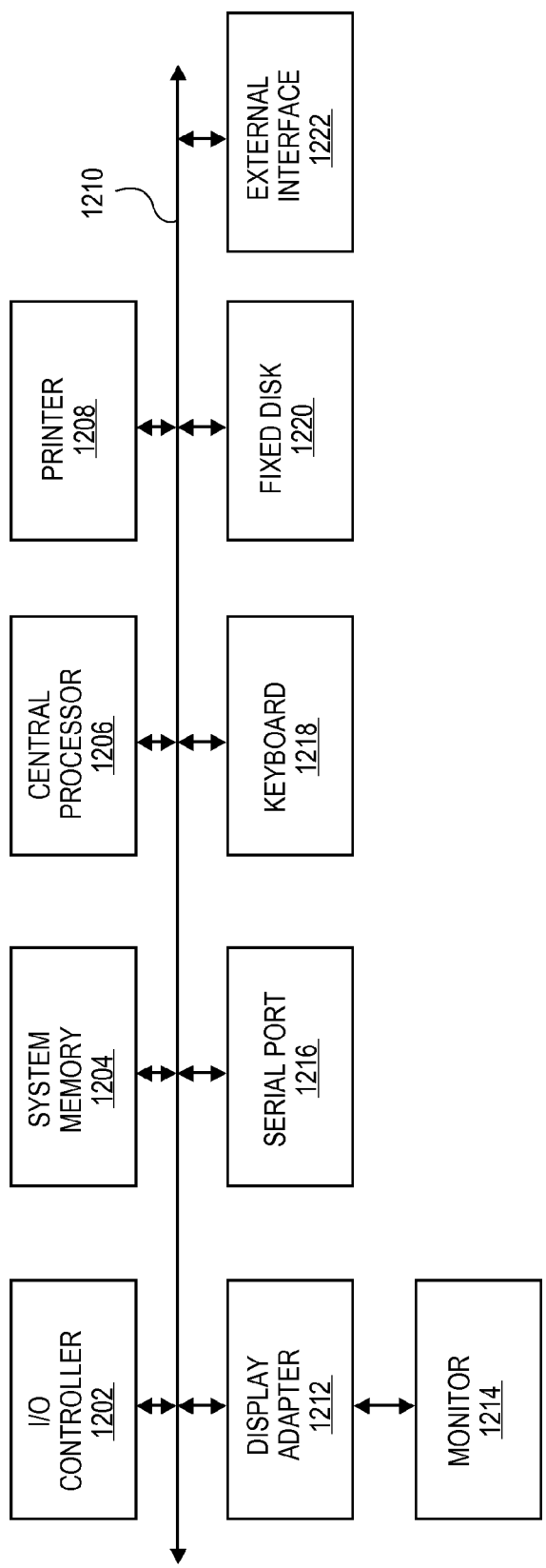
FIG. 12 shows a block diagram of an exemplary computer apparatus that can be used in some embodiments.

FIG. 12 shows a block diagram of an exemplary computer apparatus that can be used in some embodiments.

The subsystems shown in the figure are interconnected via a system bus 1210. Additional subsystems such as a printer 1208, keyboard 1218, fixed disk 1220 (or other memory comprising computer readable media), monitor 1214, which is coupled to display adapter 1212, and others are shown. Peripherals and input/output (I/O) devices, which couple to I/O controller 1202, can be connected to the computer system by any number of means known in the art, such as through serial port 1216. For example, serial port 1216 or external interface 1222 can be used to connect the computer apparatus to a wide area network such as the Internet, a mouse input device, or a scanner. The interconnection via system bus 1210 allows the central processor 1206 to communicate with each subsystem and to control the execution of instructions from system memory 1204 or the fixed disk 1220, as well as the exchange of information between subsystems. The system memory 1204 and/or the fixed disk 1220 may embody a computer readable medium.

It should be understood that the present invention as described above can be implemented in the form of control logic using computer software in a modular or integrated manner. Based on the disclosure and teachings provided herein, a person of ordinary skill in the art can know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CDROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. A recitation of "she" is meant to be gender neutral, and may be read as "he" or "she", unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving a first message from a mobile device, the first message indicating a bump sensed by an accelerometer coupled to the mobile device;
   receiving a second message from a second device, the second message indicating a bump sensed by the second device;
   temporally correlating the messages from the mobile and second devices as an event;
   determining a benefit associated with the second device; and
   sending data associated with the benefit to the mobile device based on the event.

2. The method of claim 1 wherein the second device comprises a poster display.

3. The method of claim 2 wherein:
   the poster display comprises multiple bump areas; and
   the benefit is associated with an area bumped by the mobile device.

4. The method of claim 1 wherein the data associated with the benefit includes a coupon having a bar code.

5. The method of claim 1 wherein the second message indicates a bump sensed by a pressure sensitive transducer coupled to the second device.

6. The method of claim 1 wherein the second message indicates a bump sensed by an accelerometer coupled to the second device.

7. The method of claim 1 wherein the mobile device comprises a smart phone.

8. The method of claim 1 wherein determining a benefit associated with the second device includes sending to a database a request for an advertisement or coupon and receiving the advertisement or coupon from the database.

9. The method of claim 1 further comprising:
   determining a telephone number associated with the mobile device; and
   sending data associated with the benefit in a multimedia messaging service (MMS) message to the telephone number.

10. A method comprising:
    receiving a first message from a mobile device, the first message indicating a bump sensed by an accelerometer coupled to the mobile device;
    receiving a second message from a second device displaying a benefit, the second message indicating a bump sensed by the second device;
    temporally correlating the messages from the mobile and second devices as an event; and
    recording the event,
    thereby allowing future analysis of a consumer's acknowledgement of the benefit.

11. The method of claim 10 further comprising:
    receiving a list of products from the mobile device based on the event;
    looking up information about each product in the list of products; and
    sending the information about each product.

12. The method of claim 10 further comprising:
    displaying the information on a display.

13. The method of claim 10 wherein the information about each product includes a location of each product in a store.

14. The method of claim 10 wherein:
    at least one of the first message and second messages indicates a bump intensity; and
    the bump intensity is recorded with the event.

15. The method of claim 10 wherein:
    at least one of the first message and second messages indicates a multiple bump pattern; and
    the multiple bump pattern is recorded with the event.

16. The method of claim 10 wherein:
    at least one of the first message and second messages indicates a bump direction; and
    the bump direction is recorded with the event.

* * * * *